United States Patent
Dickson

(10) Patent No.: US 11,501,671 B2
(45) Date of Patent: Nov. 15, 2022

(54) LANDSCAPING MARKING SYSTEM USING SELECTIVELY ACTUATED POP UP VISIBLE MARKERS AND METHOD OF SELECTIVELY VISIBLY IDENTIFYING SUBTERRANEAN FEATURES IMPLEMENTING THE SAME

(71) Applicant: David W. Dickson, Sewickley, PA (US)

(72) Inventor: David W. Dickson, Sewickley, PA (US)

( * ) Notice: Subject to any disclaimer, the term of this patent is extended or adjusted under 35 U.S.C. 154(b) by 0 days.

(21) Appl. No.: 17/190,446

(22) Filed: Mar. 3, 2021

(65) Prior Publication Data
US 2021/0280101 A1    Sep. 9, 2021

Related U.S. Application Data

(60) Provisional application No. 62/984,478, filed on Mar. 3, 2020.

(51) Int. Cl.
*G09F 13/00*    (2006.01)

(52) U.S. Cl.
CPC .................................. *G09F 13/00* (2013.01)

(58) Field of Classification Search
CPC ....................................................... G09F 13/00
See application file for complete search history.

(56) References Cited

U.S. PATENT DOCUMENTS

| | | | |
|---|---|---|---|
| 7,204,308 B2 * | 4/2007 | Dudley | E21B 47/00 166/254.1 |
| 7,661,838 B2 * | 2/2010 | Chen | F21S 4/10 362/183 |
| 8,454,201 B2 * | 6/2013 | Cohen | F21V 23/0464 362/183 |
| 8,810,191 B2 * | 8/2014 | Maldonado | H05B 47/16 320/101 |
| 9,364,843 B2 * | 6/2016 | Glispy | B05B 15/16 |
| 9,965,815 B1 * | 5/2018 | Campbell | H04N 21/44218 |
| 10,808,897 B2 * | 10/2020 | Wijaya | F21V 21/0824 |
| 10,902,757 B2 * | 1/2021 | Ross | F21V 14/02 |

* cited by examiner

*Primary Examiner* — Arman B Fallahkhair
(74) *Attorney, Agent, or Firm* — Blynn L. Shideler; Krisanne Shideler; BLK Law Group

(57) ABSTRACT

A landscaping marking system comprising a plurality of individually selectively actuated pop up visible markers mounted adjacent subterranean features of interest, wherein each marker includes pop-up visible components moveable between a popped up deployed visible position and a stored non-visible position and that may be reset to the stored non-visible position; and a controller for selectively actuating each marker.

13 Claims, 1 Drawing Sheet

LANDSCAPING MARKING SYSTEM USING SELECTIVELY ACTUATED POP UP VISIBLE MARKERS AND METHOD OF SELECTIVELY VISIBLY IDENTIFYING SUBTERRANEAN FEATURES IMPLEMENTING THE SAME

RELATED APPLICATION

The present invention claims priority of U.S. Provisional Patent Application Ser. No. 62/984,478 titled "Landscaping Marking System" filed Mar. 3, 2020, which application is incorporated herein by reference.

BACKGROUND OF THE INVENTION

1. Field of the Invention

The present invention relates to a landscaping marking system, more particularly to selectively actuated visible markers of sprinkler heads, valve boxes and any other subterranean features of interest.

2. Background Information

Certain landscaping operations, such as aeration, require knowledge by the landscaping workers regarding the physical location of subterranean features, such as sprinkler heads and valve boxes, to prevent damage to these elements. Often the physical location of these subterranean features are often manually marked with small flags prior to each such potentially damaging operation. For sprinkler heads the workers often turn them on so the physical location can be viewed and the location can be manually marked with flags. Turning the sprinklers on to physically view the sprinkler heads is not always a practical option for facilitating the identification and marking of their physical location, and this "turn on, view and mark" methodology does not assist in the location of subterranean valve boxes. Thus, currently the location of these subterranean elements are often marked with small flags in an inefficient manual operation.

For excavation type work there are scanning services that can map out subterranean lines using scanning equipment, such as made available by Truescan, Inc. The technology for an underground wire locator is sold by a number of companies, such as McLaughlin, Inc. which provides a range of tools for individuals to scan and identify pipes, cables, and other utility lines through a variety of methods, at a broad range of frequencies and depths. These types of scanning, mapping and marking tools, methods and services is impractical and expensive for most landscaping operations.

There remains a need for simple selectively actuated visible markers of sprinkler heads, valve boxes and any other subterranean features of interest.

SUMMARY OF THE INVENTION

The various embodiments and examples of the present invention as presented herein are understood to be illustrative of the present invention and not restrictive thereof and are non-limiting with respect to the scope of the invention. A landscaping marking system according to one aspect of the present invention comprises a plurality of individually selectively actuated pop up visible markers mounted adjacent subterranean features of interest, wherein each marker includes pop-up visible components moveable between a popped up deployed visible position and a stored non-visible position and that may be reset to the stored non-visible position; and a controller for selectively actuating each marker.

Another aspect of the present invention provides a selectively actuated pop up visible marker for a landscaping marking system and configured to be mounted adjacent subterranean features of interest, wherein each marker comprises: a housing with a tubular member; and pop-up visible components within the tubular member and moveable between a popped up deployed visible position and a stored non-visible position and that may be reset to the stored non-visible position.

Another aspect of the present invention provides a method of selectively visibly identifying subterranean features of interest comprising the steps of: mounting selectively actuated pop up visible markers adjacent subterranean features of interest, wherein each marker includes pop-up visible components moveable between a popped up deployed visible position and a stored non-visible position and that may be reset to the stored non-visible position; and remotely selectively actuating at least one marker to move the pop-up visible components thereof to the popped up deployed visible position.

These and other advantages of the present invention will be clarified in the description of the preferred embodiments taken together with the attached figures.

DESCRIPTION OF THE PREFERRED EMBODIMENTS

In summary, the present invention relates to a landscaping marking system 10 using a plurality of individually selectively actuated pop up visible markers 20 mounted adjacent subterranean features of interest and a controller 44 for selectively actuating each marker 20, wherein each marker 20 includes pop-up visible components that may be reset to a stored non-visible position.

Figure 1:
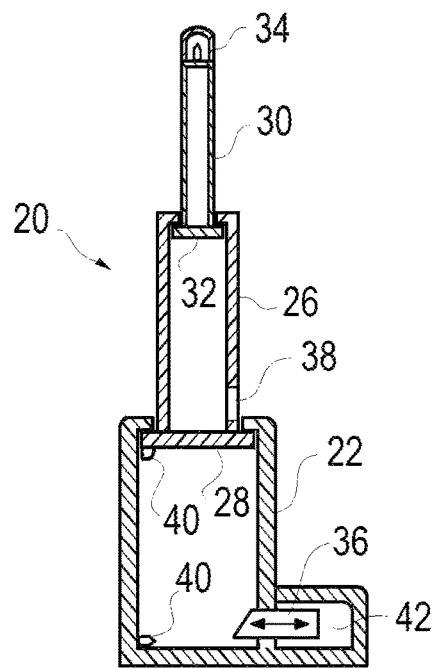
FIG. 1 is a schematic side elevation section view of a user selectable pop up, resettable visible marker of the landscaping marking system according to one embodiment of the present invention.
Figure 3:
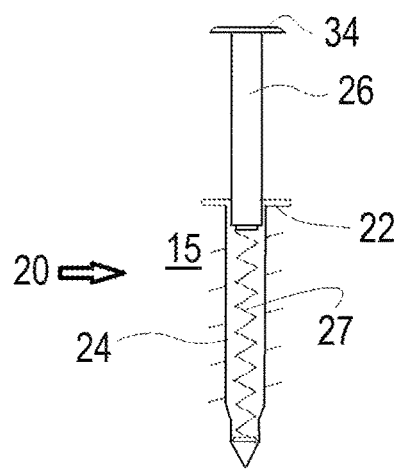
FIG. 3 is a schematic side elevation section view of a user selectable pop up, resettable visible marker of the landscaping marking system according to another embodiment of the present invention.

FIG. 1 is a schematic side elevation section view of a user selectable pop up, resettable, visible marker 20 of the landscaping marking system 10 according to one embodiment of the present invention. FIG. 3 is a schematic side elevation section view of a user selectable pop up, resettable, visible marker 20 of the landscaping marking system 10 according to one embodiment of the present invention.

The pop up visible marker 20 includes a housing 22. The housing 22 would be planted, or placed, in the ground 15 (shown in FIG. 3) adjacent the subterranean feature of interest such as a sprinkler head, a valve box, hose connection, or the corner of a golf course tee box with the top of the housing 22 generally flush with the ground 15. The pop up visible marker 20 may be placed after the installation of the subterranean features of interest when retrofitting the system 10 into existing structures.

Figure 4:
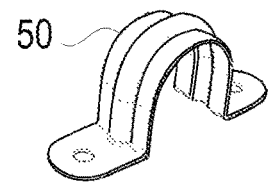
FIG. 4 is a perspective view of an attachment clamp used to secure the user selectable pop up, resettable visible marker of the landscaping marking system according to the present invention to a subterranean feature of interest.

The pop up visible marker 20 may be installed with the subterranean feature of interest, and may be physically attached to the features of interest. When installing the markers 20 and system 10 simultaneously with the installation of a subterranean system, such as an irrigation system, the housing 22 itself may include an external attachment member such that when desired a marker 20 may be glued onto, screwed onto, bolted onto, snapped onto or otherwise easily coupled to a pre-installed sprinkler head, valve box, hose connection or the like whereby the marker 20 is installed with the irrigation system itself. A separate attachment member or clamp 50, as shown in FIG. 4, may be used to secure the marker 20 to the feature of interest. The attachment clamp 50 of FIG. 4 is conventionally known as a U-shaped pipe clamp and the body of the clamp will snugly fit around the vertical tubular housing 22 of the marker and fasteners such as metal screws or bolts extending through holes in the end flanges are used to secure the attachment clamp 50 to the feature of interest. Peel and stick adhesive pads on the flanges of the attachment clamp 50 could be used in place of screws or bolts. Additionally, the feature of interest, such as the valve box housing may have an attachment member that secures to the markers 20 for such selective coupling. Finally the markers 20 may be integrated with the feature of interest. For example, a company selling irrigation systems may offer an irrigation system with the system 10 of the present invention as an upgraded version of their systems and the markers may be integral with the sprinkler heads, valve boxes and other subterranean features of the system.

The system 10 if flexible enough such that even if some of the pop up visible marker 20 are installed simultaneously with the subterranean feature of interest, and physically attached to and/or integral with the features of interest, the system 10 can incorporate additional markers for marking other pre-existing elements. For example if an irrigation system is installed and some of the markers 20 are installed simultaneously therewith, the system 10 allows for adding other markers 20 for the tee box location or other non-irrigation system marking.

The housing 22 includes a central tubular member 24 for housing the pop-up visible components of the marker 20. The pop-up visible components in FIG. 1 comprise telescoping stems 26 and 30, while in the embodiment of FIG. 3 this component is formed of a single stem 26. In other embodiments the visible components may include a pivoted flag pole with flag and or a flexible stem. For example a first telescoping U shaped stem 26 housing a spring biased flag pole (similar to stem 30) and distal end flag (similar to indicator 34), pivotally coupled to the top of the stem 26 and housed to extend downward within the U shaped stem 26 in the stored position. As the U-shaped stem 26 and flag pole clears the housing 24, the spring biased pole will pivot 180 degrees to the deployed position. The critical aspect is that in the deployed position as shown in FIG. 1, the visible components (stems 26 and 30 and indicator 34) collectively extend generally 6-12 inches above the ground so as to be easily visible to landscaping workers working around the marker 20, including those workers that may be riding a tractor or similar equipment.

The base stem 26 is movable within the tubular member 24 and is spring biased towards the pop-up position shown in FIGS. 1 and 3. A schematic spring 27 is shown in FIG. 3, however the spring is omitted from FIG. 1 for clarity. It should be apparent that the spring 27 may be "pushing" the stem 26 as shown in FIG. 3 such that it is compressed in the stored position, or it may "pull" the stem 26 to the deployed position (generally coupled to the top of the housing 22 and connected to the bottom of the stem 26 and likely surrounding the stem 26) such that the spring is placed in tension in the stored position, or even a combination of such push and pull arrangements. In FIG. 1, the base stem 26 includes a base 28 engaging the housing 22 stopping the stem 26 in the fully deployed position shown in FIG. 1 and preventing the stem 26 from moving farther than the top of the housing 22.

The telescoping top stem 30 in the embodiment of FIG. 1 is movable within the interior of base stem 26. The telescoping top stem 30 is preferably spring biased to the pop-up position (again the spring is omitted for clarity and may be operating in compression, tension or both). The telescoping stem 30 includes a base 30 engaging with the top of the stem 26 in the fully deployed position shown in FIG. 1 and preventing further upward movement of the stem 30.

The top of visible components (stem 30 in the embodiment of FIG. 1 and stem 26 in the embodiment of FIG. 3) preferably includes an indicator 34. In FIG. 1 the indicator 34 is an LED light or beacon, which light is turned on in the deployed position to increase the visibility of the pop up marker 20 when deployed. The indicator 34 may alternatively be in the form of a flag, a large reflector (as shown in FIG. 3), or other visibility enhancing mechanism. The visible LED light forming indicator 34 of FIG. 1 is believed to significantly enhance the visibility of the deployed marker 20. Any color light may be used, but red and yellow have the advantage of being noticeable and intuitively conveying caution to observers. As noted below the color of the indicator 34 may be selected to be indicative of the subterranean feature being marked.

In the telescoping embodiment of FIG. 1 the base stem 26 may be formed of rubber or other flexible material to allow the deployed visibility components to accommodate bending over without breaking. In use the markers 20 will be deployed typically when there is ongoing work suggesting that the components may be knocked accidently by workers or equipment. Flexibility of the stem 26 can accommodate inadvertent contact without breaking the markers 20. Alternatively, this may be accomplished with a flexible coupling at the bottom of the stem 26.

Regarding the marker 20 of FIG. 1, in the fully retracted or stored position the stem 30 is completely within the stem 26 which, in turn, is completely within the housing 22. A selectively operable detent member 36 will extend through a slot 38 in the stem 26 and be positioned above the base 32 to hold these members (stem 26 and stem 30) in the stored, retracted, nonvisible position. The detent member may be spring biased into the deployed position and selectively moved to a release position by an actuator 42. The detent 36 is wedge shaped so that the stems 30 and 26 can be manually pushed back into a stored and locked position with the detent biased to the locked position. As noted the detent 36 will also be moveable by the marker power supply and control 42, or actuator 42, to provide for the desired deployment the stems 26 and 30 via spring force. The detent 36 will thus be movable to disengaged position both by an actuator 42 during deployment and by mechanically pushing on the slope side of the detent 36 during manual resetting operations.

The marker 20 of FIG. 1 includes proximity sensors 40 at the base of the house in 22 and the base 28 of the stem 26. When the cooperating proximity sensors 40 are adjacent there is an indication signal from the marker power supply and control 42 that the marker 20 is in the stored nonvisible position. When the sensors 40 are no longer in proximity there is an indication signal from the marker power supply and control 42 that the marker 20 is in the deployed position. The signals from the marker power supply and control 42 are sent to a main system control 44.

The marker 20 of FIG. 1 includes the control and power supply 42 or actuator 42 for controlling the detent 36 via a unique identification signal to distinguish each marker 20 from others in the system 10, and for turning on and off the light 34 (if used), and indicating when the stems 26 and 30 are in the stored or deployed position, and for providing power to the marker 20. The power supply may be part of, or extension of, the power supply of an existing irrigations system, or may be separate (such as battery and/or solar).

The detent 36 proximity sensor and actuator 42 are omitted from FIG. 3, which is mainly showing the movement of the visible components, however these elements would be included in this embodiment and operate in generally the same fashion as described above in connection with FIG. 1.

Figure 2:
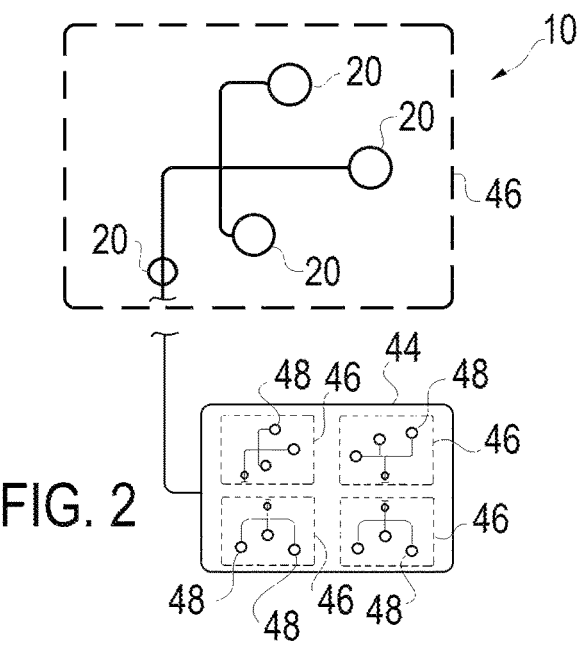
FIG. 2 is a schematic drawing showing the landscaping marking system 10 according to one embodiment of the present invention.

FIG. 2 is a schematic drawing showing control of the landscaping marking system 10 according to one embodiment of the present invention. As noted above the present invention is well-suited for marking the sprinkler heads and valve boxes of an automated irrigation system, such as found on a golf course. In such an application the markers 20 are placed at the location of the sprinkler heads as well as at the location of the various valve boxes, specifically those in which the location is required to be identified during select landscaping operations. This is schematically shown in FIG. 2. In such applications the sprinkling system is divided up into areas or zones 46 which may represent, for example, individual holes of golf course.

The landscaping marking system 10 includes a central or main control 44 that is coupled to all of the markers 20 of the system 10 and from which all of the individual markers 20 can be individually actuated. One simple control 44 utilizes a touchscreen showing a schematic layout of the system 10 with icons 48 indicating the location of the individual markers 20 within zones 46, as well as their status. It is anticipated that all of the markers 20 within a given zone 46 may be simultaneously actuated by the operator deploying the respective visible components such as stems 26 and 30. This deployment allows the individual locations within the zone 46 to be easily made visible to operators working in those areas. The individual markers 20 may also be selected and the selected markers 20 may be in more than one zone 46. The touch screen control 44 may be formed as part of a downloadable app associated with the system 10 allowing implementation of the system 10 via smartphones, tablets and similar hand held devices.

The system 10 additionally allows the icons 48 to indicate the deployed or stored status of the individual markers 20 via the proximity sensors 40. For example the icons 48 representing deployed markers 20 may show red while the icons 48 representing markers in the stored position are shown as green. In this manner the operator can, at a single glance at controller 44, determine which of the markers 20 have been deployed in which remain in the stored position.

The markers 20 of the present invention are shown for manual reset by operators in the field. Essentially the operator merely pushes down on the stems 30 and 26 (or just stem 26 for FIG. 3) returning them to the housing 22 until the detent 36 snaps into place. The proximity sensors 40 will indicate the return of the marker 20 to the stored position and the controller 44 can be appropriately updated changing the visible indication on icon 48

As suggested above the individual markers 20 coupled to the main control 44 can be individually controlled by having an individualized code. The control signals may be sent over a wire or maybe wirelessly sent with the controllers 42 having an appropriate transmitter and receiver built there in. The power supply of the controllers 42 maybe couple to the power supply for the sprinkling system or may be independent as suggested above. Further the power supply may be remote or the individual markers may be battery powered or even solar powered.

The system 10 of the present invention allows an operator at a central or remote location to check the progress of workers in the field. Specifically as the workers are moving through a section or area of work (such as a zone 46) they will manually reset the markers 20, the relevant icons 48 will change the indication status as the markers 20 are returned to the stored position. In this manner a remote (or centrally located) operator (supervisor) can see how the workers are progressing as the deployed markers 20 are returned to the stored position The present invention is not limited to sprinkler systems although this is an important implementation. Another use in a golf course landscaping application is identifying tee boxes on a golf course which periodically have to be "squared" or re-aligned. The markers 20 can be placed at the precise corners and selectively deployed to make the periodic squaring procedure a relatively simple procedure, typically performed once every few weeks.

The system 10 is not limited to landscaping procedures on golf courses as discussed above and has other applications. For example there may be times where a party needs to know exactly where a gas line is running or other utility line through a property due to other work without engaging an expensive scanning service. Alternatively the system 10 can be deployed by a scanning company after being hired to scan for select subterranean features, with the system 10 allowing for perpetual use of the scanned results by a customer. The system 10 allows a building or a complex manager to precisely, selectively and visibly mark gas lines, electric lines, and other buried utility lines, including identifying them by line type, in the single control system 10. Where the system 10 is used to identify distinct types of subterranean features the indicator 34 may be aligned to identify the specific type of subterranean feature (e.g. Blue LED light for water line, green LED light for gas line, White LED lights for electric lines).

Whereas particular embodiments of the invention have been described above for purposes of illustration, it will be evident to those skilled in the art that numerous variations of the details of the present invention may be made without departing from the spirit and scope of the present invention.

What is claimed is:
1. A landscaping marking system comprising
a plurality of individually selectively actuated pop up visible markers mounted adjacent subterranean features of interest, wherein each marker includes pop-up visible components moveable between a popped up deployed visible position and a stored non-visible position and that may be reset to the stored non-visible position, wherein each pop up visible marker includes a housing with a tubular member with the pop up visible components including at least one stem movable therein; and a controller for selectively actuating each marker, wherein each marker includes a proximity sensor configured to provide an indication signal to the controller that the marker is in the stored nonvisible position and an indication signal to the controller that the marker is in the deployed position; wherein the controller includes a touchscreen showing a schematic layout of the system with icons indicating the location of the individual markers as well as their status as indicated by the proximity sensors.

2. The landscaping marking system according to claim 1, wherein at least one stem includes an indicator at a distal end thereof.

3. The landscaping marking system according to claim 2, wherein the color of each indicator is indicative of the subterranean feature being marked.

4. The landscaping marking system according to claim 3, wherein at least one indicator is an LED light.

5. The landscaping marking system according to claim 1, wherein at least one stem is spring biased to a deployed position within the tubular member.

6. The landscaping marking system according to claim 1, wherein at least one pop up visible marker includes a selectively operable detent member for holding the pop-up visible components in the stored non-visible position.

7. The landscaping marking system according to claim 1, wherein each detent member is spring biased into a deployed position holding the pop-up visible components in the stored non-visible position and selectively moved to a release position by an actuator controlled by the controller.

8. The landscaping marking system according to claim 1, wherein each detent member is wedge shaped so that the pop-up visible components may be manually reset to the stored non-visible position.

9. A selectively actuated pop up visible marker for a landscaping marking system and configured to be mounted adjacent subterranean features of interest, wherein each marker comprises:
 a housing with a tubular member; and
 pop-up visible components within the tubular member and moveable between a popped up deployed visible position and a stored non-visible position and that may be reset to the stored non-visible position, wherein the pop up visible components include at least one stem, and wherein at least one stem is spring biased to a deployed position within the tubular member, wherein at least one stem includes an indicator at a distal end thereof, wherein the color of the indicator is indicative of the subterranean feature being marked;
 a proximity sensor configured to provide an indication signal that the marker is in the stored nonvisible position and an indication signal that the marker is in the deployed position
 a controller for selectively actuating the marker, wherein the controller includes a touchscreen showing an icon indicating the location of the marker as well as the status as indicated by the proximity sensor.

10. The selectively actuated pop up visible marker according to claim 9, further including a selectively operable detent member for holding the pop-up visible components in the stored non-visible position.

11. The selectively actuated pop up visible marker according to claim 10, wherein the detent member is spring biased into a deployed position holding the pop-up visible components in the stored non-visible position and selectively moved to a release position by an actuator, and wherein each detent member is wedge shaped so that the pop-up visible components may be manually reset to the stored non-visible position.

12. A method of selectively visibly identifying subterranean features of interest comprising the steps of:
 mounting selectively actuated pop up visible markers adjacent subterranean features of interest, wherein each marker includes pop-up visible components moveable between a popped up deployed visible position and a stored non-visible position and that may be reset to the stored non-visible position;
 providing an indication signal from a proximity sensor on each marker to a controller that the marker is in the stored nonvisible position or an indication signal to the controller that the marker is in the deployed position;
 showing a schematic layout of the system with icons on a touchscreen of the controller indicating the location of the individual markers as well as their status as indicated by the proximity sensors; and
 remotely selectively actuating at least one marker via the touchscreen to move the pop-up visible components thereof to the popped up deployed visible position and updating the status icon.

13. The method of selectively visibly identifying subterranean features of interest according to claim 12 further including the step of manually resetting the pop-up visible components from the popped up deployed visible position to the stored non-visible position and updating the status icon.

\* \* \* \* \*